(No Model.)

G. AMBORN, Jr.
CHAIN WRENCH.

No. 570,213.  Patented Oct. 27, 1896.

Witnesses
Chas. H. Smith
J. Staib

Inventor
George Amborn Jr
per L. W. Serrell & Son
Atty

UNITED STATES PATENT OFFICE.

GEORGE AMBORN, JR., OF BROOKLYN, NEW YORK, ASSIGNOR TO THE J. H. WILLIAMS & COMPANY, OF SAME PLACE.

CHAIN WRENCH.

SPECIFICATION forming part of Letters Patent No. 570,213, dated October 27, 1896.

Application filed April 6, 1896. Serial No. 586,316. (No model.)

*To all whom it may concern:*

Be it known that I, GEORGE AMBORN, Jr., a citizen of the United States, residing at Brooklyn, in the county of Kings and State of New York, have invented an Improvement in Chain Wrenches, of which the following is a specification.

Chain wrenches have been made in which the chain has been passed around the pipe or other article to be rotated and the links received upon or between hooks, so as to hold the chain while the wrench is being moved.

In some instances the chain has been made of plate-links and in other instances of elliptical links, usually known as a "cable-chain." This cable-chain is adapted to being passed around the pipe or other article in different directions, and hence is in many respects preferable for use upon bends, curves, and T's; but the chain that is made of plate-links riveted together, the rivets forming pivot-pins, is less liable to injure the pipe by indenting the same than the cable-chain; but it cannot be passed around the pipe or other article except in a plane substantially perpendicular to the cylindrical surface. The cable-chains are made of welded rods, and their strength is limited to the weakest and most imperfect welds, and the ends of the links, being single, are liable to break under strain.

The object of the present invention is to combine the advantageous features of the two chains aforesaid and to construct a chain for wrenches entirely of hard forged steel without any welds, so as to obtain the greatest strength in proportion to weight, and at the same time such chain can be deflected or bent in any desired direction in passing it around the pipe or fitting.

Figure 1:
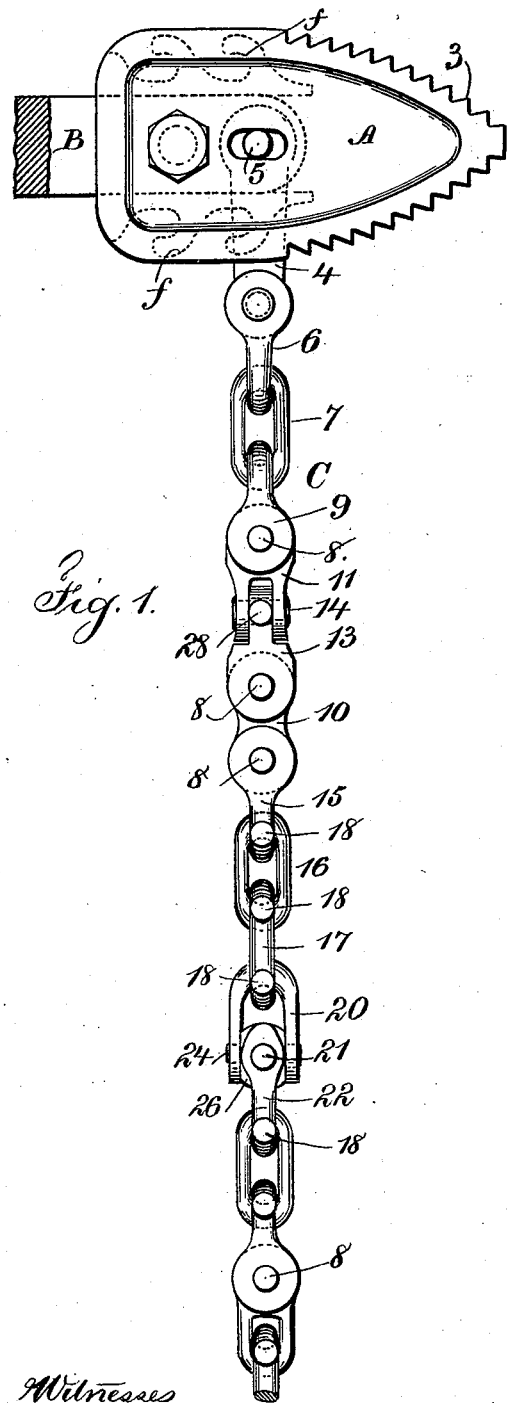
Figure 2:
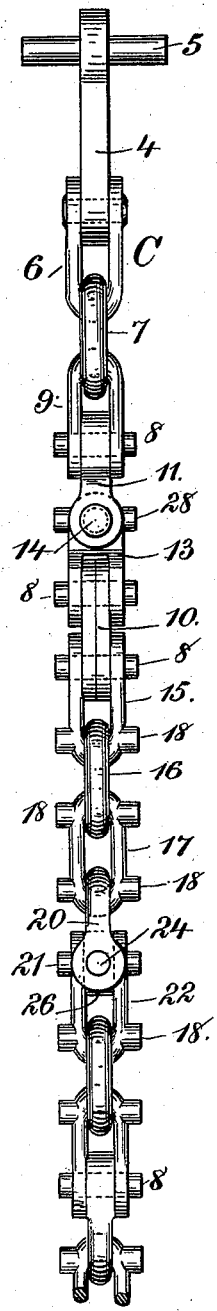

In the drawings, Figure 1 is a side view showing the jaws of a wrench with a chain attached thereto, and Fig. 2 is an elevation of the chain at right angles to Fig. 1.

The jaws A and handle B or lever are of any desired character. I, however, prefer to provide teeth or serrations 3 upon the edges of the jaws and to connect the chain C by the link 4, which passes in between the jaws and into a slot between the forked ends of the handle or lever, and the cross-pin 5 is within the slot or longitudinal mortise that passes through the jaws and through the fork of the handle. The object of providing this slot is to allow the cross-pin 5 to be moved toward or from the serrations or place of bearing of the jaws upon the article to be turned, so that in relieving the strain upon the chain by moving the handle in the opposite direction the cross-pin may be slipped either one way or the other in the mortise to aid in liberating the chain and preventing the parts becoming wedged upon the pipe or fitting.

I find it advantageous to employ one or more oval or cable links 7, as these allow the chain to be moved freely in any direction closely adjacent to the jaw, and it is not necessary at these links to make any provision for connecting them removably with the hooks or projections upon the jaw, because these parts have to be passed around the pipe or other article. The link 7, however, is not to be welded, but forged out of suitable iron or steel, and to connect the same to the link 4 I employ the clevis-link 6, that is open at one end and receives through it the cross-rivet connecting it to the link 4.

I provide projections 8 in the form of studs at suitable intervals apart throughout the other portions of the chain, which studs engage hooks or projections *f* upon the jaws, such, for instance, as those shown in Letters Patent No. 542,136 or No. 499,508.

The clevis-links 6 and 9 are each made with one end approximately similar to one end of the cable-link 7, and the other end is made similar to one end of a plate-link, such plate-link being shown at 10. Instead of the ends of the links 6, 7, and 9 being of the same thickness as the sides of the links, as in ordinary cable-links, such ends are thicker, so as to be equal in strength, or nearly so, to the two side portions, thus obtaining the necessary strength and lightness.

The projections 8 are made by the ends of the cross pins or pivots that connect the respective links; but the links 15, 17, and 22 have projections 18 forged on them, such projections corresponding in size and shape to the ends 8 of the pivot-pins.

The links 11 and 13 are substantially similar, with the exception that the link 11 has one part that passes between the jaws of the clevis-link 9, and the link 13 has two parts or a jaw receiving between it the links 10, and these parts 11 and 13 are pivoted together upon the cross-pin or rivet 14, there being a tongue upon the link 13 that goes between the jaws upon the link 11, and hence the joint between 11 and 13 is perpendicular to the joint between 9 and 11, so that the parts can swing in opposite directions as the chain may be wrapped around a pipe-fitting or other article, and upon the tongue of the link 13 the lateral projections 28 are provided for engaging the jaws of the wrench.

The clevis-link 15 is similar to the link 9, so as to connect the plate-links 10 with the cable-link 16, and this link 15 has projections 18 at the rounded end of it the proper distances from the other projections for engaging the hooks or projections upon the jaws of the wrench, and the cable-link 17 is made with the lateral projections 18 at each end; but these do not interfere with the freedom of movement of the cable-links when they are wrapped around the pipe or fitting.

The clevis-link 20 is similar to the links 6 and 9, and the link 22 is similar to the link 15, and the links 20 and 22 are united to a universal piece 26, the rivets 24 in this instance being formed by studs extending out from the piece 26 and passing through the round ends of the link 20, there being a cross-rivet 21 passing through the ends of the clevis-link 22 and through the piece 26, the cross-rivet 21 being perpendicular to the rivets 24, so that the links 20 and 22 can stand at any desired angle or inclination one to the other.

It is generally preferable to employ links in the order indicated herein, as the chain has flexibility in different directions and is best adapted to the objects intended; but the order in which the different links may be placed in the chain will vary according to the particular object for which the wrench may be constructed.

The sides of the links 11 and 13 are adapted to bear against the cylindrical surface of the pipe or other article because the end portions of these links are wider than the joints through which the pin 14 passes. Hence there is but little tendency to bend the tongue that comes between the jaws of the links 11.

The piece 26 and the studs and rivets form with the clevis-link a universal joint, and instead of the rivet 21 passing through such piece 26 there may be projecting studs in the same place. It is to be understood that the clevis-links having the eyes for the studs are sprung open to introduce the joint-piece and then bent back to shape.

It will be apparent that the projections which engage the hooks upon the wrench are in all instances immediately adjacent to the curved end of either the link or the shackle, and hence such projections are rigid and not liable to be bent, because they are connected across the strong and thick end of the link or shackle, whereas in links that have heretofore been used with projections upon the straight sides the projections act with a leverage to bend the metal of the straight sides, the same being unsupported by a connection from one side to the other, and in all cases the centers of the projections on the links are in line, or nearly so, with the inner surfaces of the links at their ends, where one link contacts with the next. Hence the distances between the projections remain substantially the same even when one elliptical link or clevis-link is at an angle to the next.

I claim as my invention—

1. The combination with the wrench having jaws and a lever, of a chain, an end link to the chain passing into a mortise between the jaws, and a cross-pin passing through the end link, there being a cross-mortise through the jaws for receiving the cross-pin and allowing the same to be moved laterally in either direction, and means for engaging the chain after it has been passed around the pipe or other article, substantially as set forth.

2. The combination with the handle and jaws in a wrench, of a chain composed of cable-links and plate-links, substantially as and for the purposes set forth.

3. The combination in a wrench with the handle and jaws, of a chain having a cable-link, a plate-link and a clevis-link passing through the cable-link and riveted to the plate-link, substantially as set forth.

4. The combination with the handle and jaws in a wrench, of a chain having elliptical links one passing through the other, there being studs projecting from opposite sides of the links immediately adjacent to the rounded ends of such links and adapted to engage the projections upon the wrench, substantially as set forth.

5. The combination with the jaws and lever in a wrench, of a chain connected at one end to the lever and having links with universal joints between one link and the next and projections at opposite sides of the chain and in line with each other for engaging the hooks upon the wrench, substantially as set forth.

6. The combination in a chain for chain wrenches, of open clevis-links and complete links with similar ends having laterally-projecting studs at both sides and ends, substantially as specified.

7. The combination in a chain for chain wrenches, of open clevis-links with studs projecting from the sides adjacent to the end bends, and complete links with similar ends having laterally-projecting studs at both sides and ends, substantially as specified.

8. The chain for chain wrenches having clevis-links standing in opposite directions with a universal-joint piece between their open ends, substantially as specified.

Signed by me this 23d day of March, 1896.

GEORGE AMBORN, JR.

Witnesses:
LOUIS A. WENDT,
WILLIAM C. REDFIELD.